Sept. 15, 1959  T. J. QUIRK, JR  2,904,030
PORTABLE INDOOR CHARCOAL BROILER
Filed Oct. 24, 1955  2 Sheets-Sheet 1

INVENTOR.
THOMAS J. QUIRK, JR.
BY
ATTORNEY

Sept. 15, 1959 T. J. QUIRK, JR 2,904,030
PORTABLE INDOOR CHARCOAL BROILER
Filed Oct. 24, 1955 2 Sheets-Sheet 2

INVENTOR.
THOMAS J. QUIRK, JR.
BY
S.B. Schlessel
ATTORNEY

United States Patent Office 2,904,030
Patented Sept. 15, 1959

2,904,030
PORTABLE INDOOR CHARCOAL BROILER

Thomas J. Quirk, Jr., New York, N.Y.

Application October 24, 1955, Serial No. 542,369

3 Claims. (Cl. 126—25)

This invention relates to charcoal broilers and has for its objective the provision of a charcoal broiler unit which is adapted to eliminate the smoke and poisonous gases resulting from the combustion of charcoal, so as to render the broiler unit safe and convenient for indoor use.

In the present state of the art of broiling meats and other foodstuffs by the use of charcoal combustion the operation has been mainly restricted to outdoor use for the reason that the smoke and carbon monoxide given off in the combustion process can thus escape to the upper air and not contaminate the air surrounding the persons using same. Were such use of charcoal combustion made within the confines of a room or house the smoke and carbon monoxide gas given off in the process would soon replace the oxygen in the room air, with dangerous, if not fatal, results to persons in or near the room.

Methods have been employed whereby the use of commercial charcoal broilers of large size has been made indoors, but only coupled with exhaust pipes and vents drawing the smoke and carbon monoxide out of the building and leading same by means of a chimney or smoke-stack into the upper air far above street level. Constructions of this kind are large, cumbersome, commercial affairs, and do not destroy the poisonous gases, but merely carry them off.

In view of the desirability of charcoal broiling of meats and other foodstuffs through which the meats and foodstuffs develop a flavor and taste quite unlike other methods of cooking and broiling, and substantially in demand, I have devised a portable charcoal broiler for home as well as commercial use, whereby the smoke and carbon monoxide resulting from the combustion of the charcoal is assimilated and absorbed by the unit itself, requiring no connecting pipes or exhausts to the outdoors.

One of the principal objects of my invention, therefore, is to provide a portable indoor charcoal broiler unit adapted to assimilate and absorb the smoke and carbon monoxide resulting from charcoal combustion.

A second important object of my invention is to provide a portable indoor charcoal broiler unit for home or small family use.

At third important object of my invention is the construction of a portable indoor charcoal broiler unit which will occupy a relatively small space and can be moved from place to place as desired, and stored when not in use.

A fourth important object of my invention lies in the construction of a portable indoor charcoal broiler unit in combination with an electric broiler, so that the unit can be used for charcoal or electric broiling as desired.

Still another important object of my invention is the provision of a portable indoor charcoal broiler unit which is simple to construct and operate.

Other salient objects, advantages and functional features of my invention, together with the novel features of construction, combination and arrangement of parts, will more readily appear from an examination of the following description, taken with the accompanying drawings of a preferred embodiment, wherein.

Similar reference characters designate similar parts throughout the different views.

Figure 1:
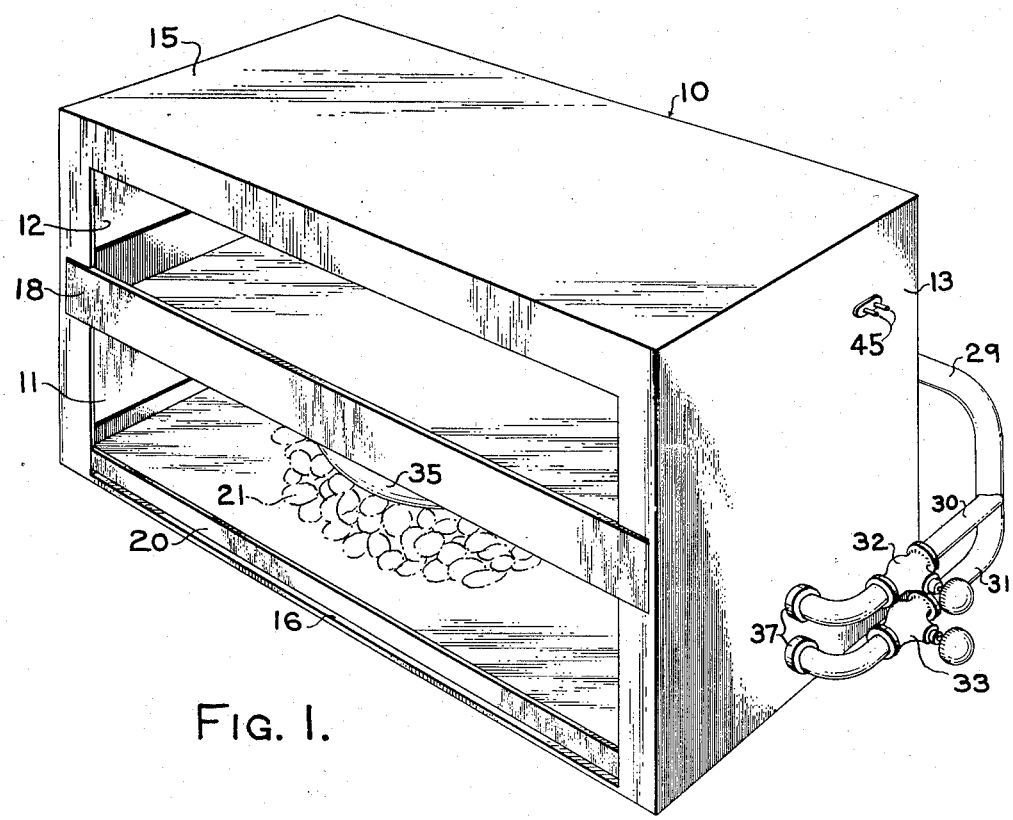
Fig. 1 is a side, perspective view of a preferred embodiment of my invention.
Figure 2:
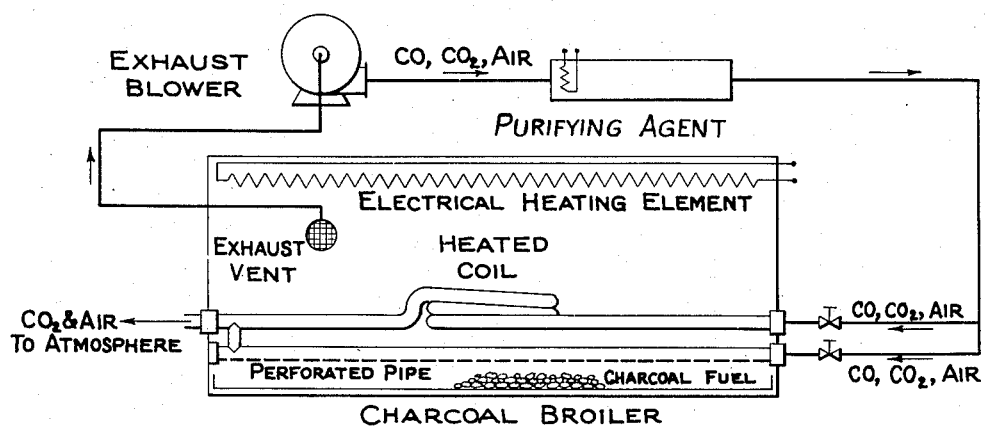
Fig. 2 is a diagrammatic view showing flow of gases in the unit shown by Fig. 1, together with means for absorption and elimination of smoke and carbon monoxide gas, and method of application.
Figure 3:
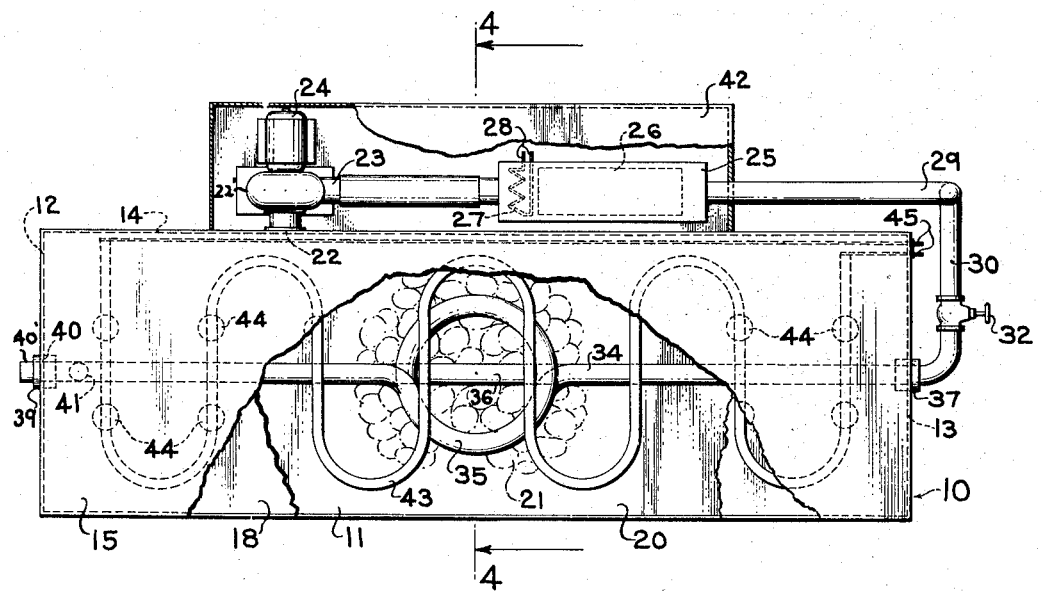
Fig. 3 is a top view, partly broken away to show inner construction, of the embodiment shown by Fig. 1.
Figure 4:
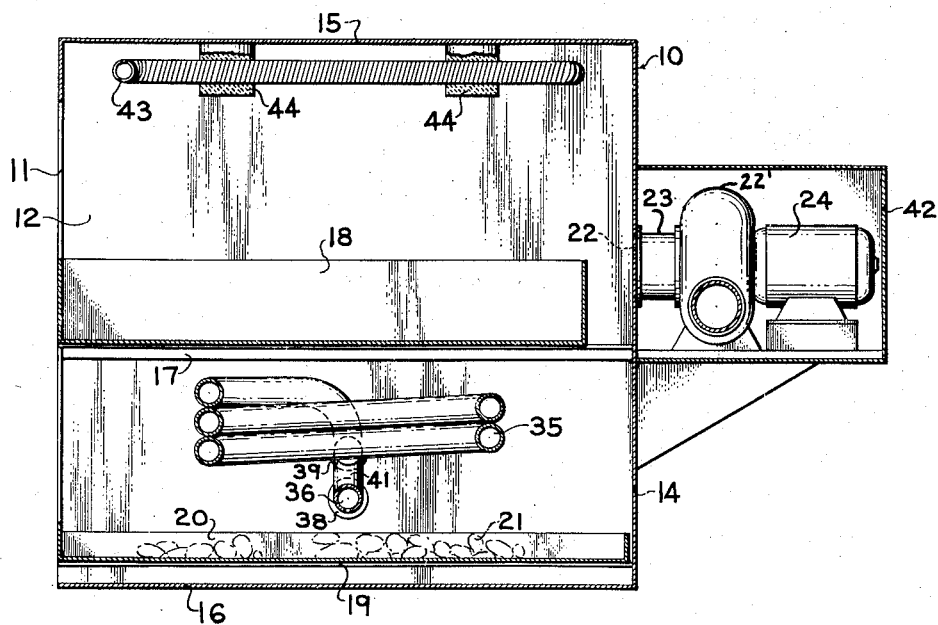
Fig. 4 is a cross-sectional view, taken on lines 4—4 of Fig. 3.

Illustrative of the embodiment shown, the portable indoor charcoal broiler unit comprises a housing 10 having a front opening 11 and enclosed otherwise by means of side walls 12 and 13, rear wall 14, roof 15 and floor 16. The interior surfaces of the walls 12 and 13 are provided medially with flanges 17 adapted to support a food tray 18 which is slidable thereon, and adjacent the floor 16 with flanges 19 adapted to support a fuel tray 20 containing charcoal 21 slidable thereon. It is to be understood that the interior surfaces of the walls 12 and 13 may be provided with a series of spaced flanges 17 instead of one, whereby the food tray 18 may be supported within the housing 10 at different heights therein.

The rear wall 14 is provided with an exhaust opening 22 to which is connected a direct-driven exhaust blower 22' leading into a pipeline 23. A motor 24 operating with its fan within the blower 22' acts to draw the smoke and carbon monoxide created by combustion of the charcoal 21 within the housing 10 out of the housing 10 and drive the smoke and carbon monoxide through the pipe 23 and through a chamber 25 to which the pipe 23 is connected. The chamber 25 may be filled with activated charcoal 26 and as the smoke and gases are forced through the activated charcoal 26 the smoke and carbon monoxide is absorbed thereby in large part. A pipeline 29 is connected to the opposite side of the chamber 25 to receive the gases passing therefrom, and branches into two pipelines 30 and 31, which are secured to the outer surface of the wall 13 and open into the housing 10, as shown, the pipelines 30 and 31 being provided with valves 32 and 33 by means of which the flow of gases therethrough are controlled.

A pipe line 34 is disposed within the housing 10, provided medially with coils 35, as well as a perforated pipeline 36, the pipe-lines 34 and 36 being disposed between the food tray 18 and the fuel tray 20 and removably connected to the pipelines 30 and 31 by means of couplings 37 at one end of the housing 10 and removably connected to the wall 12 at the other end of the housing 10 by means of couplings 38 and 39, so that the pipelines 34 and 36 may be uncoupled and removed from the housing 10 as desired. The pipelines 34 and 36 are engaged together adjacent the wall 12 by means of a hollow connection member 41 permitting circulation of gases between them. The wall 12 is further provided with an opening 40 in registry with the end of the pipeline 34, so as to permit the gases flowing in the pipelines 34 and 36 to pass out of the housing 10 through the connecting tube 40'.

Within the chamber 25 there is provided an electric element or coil 27 extending into terminals 28 outside of the chamber 25, for purposes which will be hereinafter explained. A casing 42 is provided at the rear of the housing 10, enclosing the exhaust blower 22', pipeline 23, motor 24 and chamber 25, as shown.

Electric heating coils 43 are provided adjacent the interior of the roof 15 of the housing 10, secured to the roof 15 by means of attachment members 44, and provided with terminals 45 for connection with an electric source.

In the operation of the charcoal broiler unit the charcoal 21 is placed upon the fuel tray 20 within the housing 10. The meat or other food to be broiled is placed upon the food tray 18. The charcoal 21 is then ignited in the usual manner, and the motor 24 is turned on. As the combustion of the charcoal 21 occurs the smoke and carbon monoxide released within the housing 10 is drawn out therefrom and into the pipeline 23 through the exhaust opening 22 by operation of the motor 24 within the blower 22'. The gases, including carbon monoxide, are forced through the activated charcoal 26 within the chamber 25, whereby the smoke and carbon monoxide are absorbed in large part by the activated charcoal 26, the carbon monoxide being converted to carbon dioxide. The gases, including any remaining carbon monoxide, are then carried through pipelines 29, 30 and 31 into pipelines 34 and 36 within the housing 10, the gases entering into the perforated pipeline 36 and into the coils 35 of the pipeline 34 becoming subjected to the heat coming from the burning charcoal and further combusted to increase the temperature within the housing 10 by the oxidation of the carbon monoxide into carbon dioxide, in which state the now harmless gases pass out of the housing 10 through the opening 40 into the room. As the smoke and carbon monoxide created by the combustion of the charcoal 21 is drawn out of the housing 10 through the exhaust opening 22, they are replaced by fresh air entering the housing 10 through its front opening 11, the fresh air thus entering combining with the carbon monoxide entering through the perforated pipeline 36 to form carbon dioxide by the combustion of the charcoal 21, the introduced fresh air providing the oxygen necessary for the continued combustion of the charcoal 21.

The activated charcoal 26 presents only one form of purifying agent for the absorption of the smoke and carbon monoxide as they are forced through the chamber 25. Other forms of purifying agents may be substituted. For example, the purifying agent used within the chamber 25 may consist of porcelain carriers processed with a thin film of catalytic alumina and platinum alloy. With the use of such a purifying agent the electric coil 27 within the chamber 25 is connected to a source of electrical energy so that the temperature of the purifying agent is raised, thereby causing the conversion of the carbon monoxide to carbon dioxide, the further oxidation of the gases raising their temperature, and the return of the hot gases into the housing 10 by means of the pipelines 34 and 36 hastening the broiling process.

The portable indoor charcoal broiler unit may be converted into an electric broiler unit by the removal of the fuel tray 20, and by uncoupling and removing the pipelines 34 and 36 from the interior of the housing 10. The terminals 45 of the electric heating coils 43 are then connected to an electrical energy source by which the meat or other food on the tray 18 may be broiled.

It will be seen, therefore, from the above description and the accompanying drawings, that my invention is superior to and novel over the prior art in that it provides a charcoal broiler unit for indoor use in that it absorbs and eliminates the smoke and carbon monoxide created by the combustion of charcoal.

The embodiments shown and described are by way of illustration only, and various changes may be made in the construction, size and arrangement of parts, as well as interchanging of parts and substantial equivalents without limitation upon or departure from the spirit and scope of the invention, or sacrificing any of the advantages thereof inherent therein.

Having described my invention, I claim:

1. A charcoal broiler of the type described comprising a housing, food containing means and charcoal containing means disposed within the housing, an exhaust vent, an exhaust blower, motor means to actuate the blower, a purifying chamber, a pipe line adapted to carry the gases from the housing into the chamber, a catalyst comprising porcelain carriers processed with a thin film of catalytic alumina and platinum alloy disposed within the chamber, a heating element disposed within the chamber anterior the catalyst, pipe lines extending through the housing between the food containing means and the charcoal containing means, adapted to return the gases from the chamber into the housing, means to introduce air into the housing, one of the pipe lines within the housing provided centrally with a plurality of coils, the other pipe line provided with perforations along its bottom surface to allow recombustion of the returned gases with the air, a connecting member for said one and other pipe lines adapted to allow intermingling of the gases carried by each, and means to allow the burned gases to escape from the housing.

2. A charcoal broiler as described in claim 1, the pipe lines within the housing secured to the walls of the housing by means of detachable couplings, and adapted to be removed from the housing by release from the couplings.

3. A charcoal broiler comprising a housing, food containing means and charcoal containing means disposed within the housing with the charcoal containing means disposed below the food containing means, an exhaust vent, an exhaust blower, motor means to actuate the blower, a purifying chamber, a pipe line adapted to pass the gases from the housing through the chamber, a purifying agent disposed within the chamber, pipe lines adapted to conduct the gases from the chamber through the housing between the food containing means and the charcoal containing means, means to introduce air into the housing, one of the pipe lines within the housing provided centrally with a plurality of coils, the other pipe line provided with perforations along its bottom surface, to allow recombustion of the returned gases, a connecting member for said one and other pipe lines, and means to allow the burned gases to leave the housing through one of the last recited pipe lines.

References Cited in the file of this patent

UNITED STATES PATENTS

| | | |
|---|---|---|
| 59,397 | Hutson | Nov. 6, 1866 |
| 910,876 | Smith | Jan. 26, 1909 |
| 1,716,479 | Bilsky | June 11, 1929 |
| 1,909,207 | Mikody | May 16, 1933 |
| 2,159,027 | Jalma et al. | May 23, 1939 |
| 2,172,715 | Schwartzkopf | Sept. 12, 1939 |
| 2,573,115 | Sisto | Oct. 30, 1951 |
| 2,658,742 | Suter et al. | Nov. 10, 1953 |
| 2,770,318 | Triggs | Nov. 13, 1956 |
| 2,791,997 | Monkowski | May 14, 1957 |
| 2,795,054 | Bowen | June 11, 1957 |